(12) United States Patent
Lin (10) Patent No.: US 9,919,184 B2
(45) Date of Patent: Mar. 20, 2018

(54) AIR-CLEANING FITNESS DEVICE

(71) Applicant: Hao-Tsang Lin, Taipei (TW)

(72) Inventor: Hao-Tsang Lin, Taipei (TW)

( * ) Notice: Subject to any disclaimer, the term of this patent is extended or adjusted under 35 U.S.C. 154(b) by 57 days.

(21) Appl. No.: 15/150,704

(22) Filed: May 10, 2016

(65) Prior Publication Data

US 2017/0326410 A1 Nov. 16, 2017

(51) Int. Cl.
*B01D 46/00* (2006.01)
*A63B 71/00* (2006.01)
*A63B 22/06* (2006.01)
*A63B 23/04* (2006.01)

(52) U.S. Cl.
CPC ...... *A63B 22/0605* (2013.01); *A63B 23/0476* (2013.01); *B01D 46/0023* (2013.01); *B01D 46/0041* (2013.01); *A63B 2022/0635* (2013.01)

(58) Field of Classification Search
CPC B01D 46/00; B01D 46/0041; B01D 46/0047; B01D 2273/30; B01D 2279/40; A63B 71/00
USPC ............... 55/385.1, 471–473; 482/1, 3, 4, 9
See application file for complete search history.

(56) References Cited

U.S. PATENT DOCUMENTS

| | | | |
|---|---|---|---|
| 2015/0113924 A1* | 4/2015 | Mathews | B01D 46/0002 55/357 |
| 2015/0352479 A1* | 12/2015 | Kim | B03C 3/32 55/471 |
| 2016/0138507 A1* | 5/2016 | Klassen | F02M 35/0209 123/198 E |
| 2016/0175472 A1* | 6/2016 | Tan | A61L 9/122 422/4 |
| 2017/0043288 A1* | 2/2017 | Reitz | B01D 46/0041 |

* cited by examiner

*Primary Examiner* — Frank Lawrence, Jr.
*Assistant Examiner* — Minh-Chau Pham
(74) *Attorney, Agent, or Firm* — C. G. Mersereau; Nikolai & Mersereau, P.A.

(57) ABSTRACT

An air-cleaning fitness device has a main frame, a housing, a driving assembly, a fan device and at least one filter. The housing, the driving assembly and the fan device are mounted on the main frame. The housing has a confined space and an airflow passage. The driving assembly and the fan device are located inside the housing and connect to each other. The fan device has a second inlet and a second outlet. The second inlet and the second outlet are respectively aligned with two ends of the airflow passage. The at least one filter is mounted on the housing and is capable of covering either end of the airflow passage. The driving assembly has at least one driving member which extends out of the housing and drives the fan device. When the user operates the air-cleaning fitness device, the air-cleaning fitness device purifies the air at the same time.

15 Claims, 8 Drawing Sheets

AIR-CLEANING FITNESS DEVICE

BACKGROUND OF THE INVENTION

1. Field of the Invention

The present invention relates to a fitness device, and more particularly to a fitness device that can purify the air under the operation. The fitness device that has multiple functions is operated to exercise and to purify the air.

2. Description of the Related Art

The modern life is characterized by compact-cluster and fast paces. Thus, people have insufficient space and time to excise. Therefore, the fitness device that has a small size in retraction is accepted widely. The user operates the fitness device indoors for health.

Meanwhile, the air pollution is worsening gradually. Atmosphere is full of suspension and pollutants that are inhaled by the human body. The suspension and pollutants are hazardous to people's health and endanger their lives.

However, the conventional fitness device merely increases the physical load which makes the user exercising. Therefore, the conventional fitness device only has one function and does not avert the problem of air pollution.

SUMMARY OF THE INVENTION

An objective of the present invention is to provide a fitness device, and more particularly to a fitness device that can purify the air under the operation. The fitness device that has multiple functions allows the user to exercise and purifies the air at the same time.

To achieve the foregoing objective, the air-cleaning fitness device has a main frame, a housing, a driving assembly, a fan device and at least one filter. The main frame has a base, a mounting bracket and a seating element. The mounting bracket has a first end that is mounted on the base and a second end. The seating element is mounted on the second end of the mounting bracket. The housing is mounted on the base of the main frame and has a confined space and an airflow passage. The driving assembly is mounted on the main frame, is located inside the housing, and has at least one driving member that extends out of the housing. The fan device is mounted on the main frame, is located inside the housing, and connects to the driving assembly. The at least one filter is mounted on the housing and covers the airflow passage of the housing.

Other objectives, advantages and novel features of the invention will become more apparent from the following detailed description when taken in conjunction with the accompanying drawings.

DETAILED DESCRIPTION OF THE INVENTION

Figure 1:
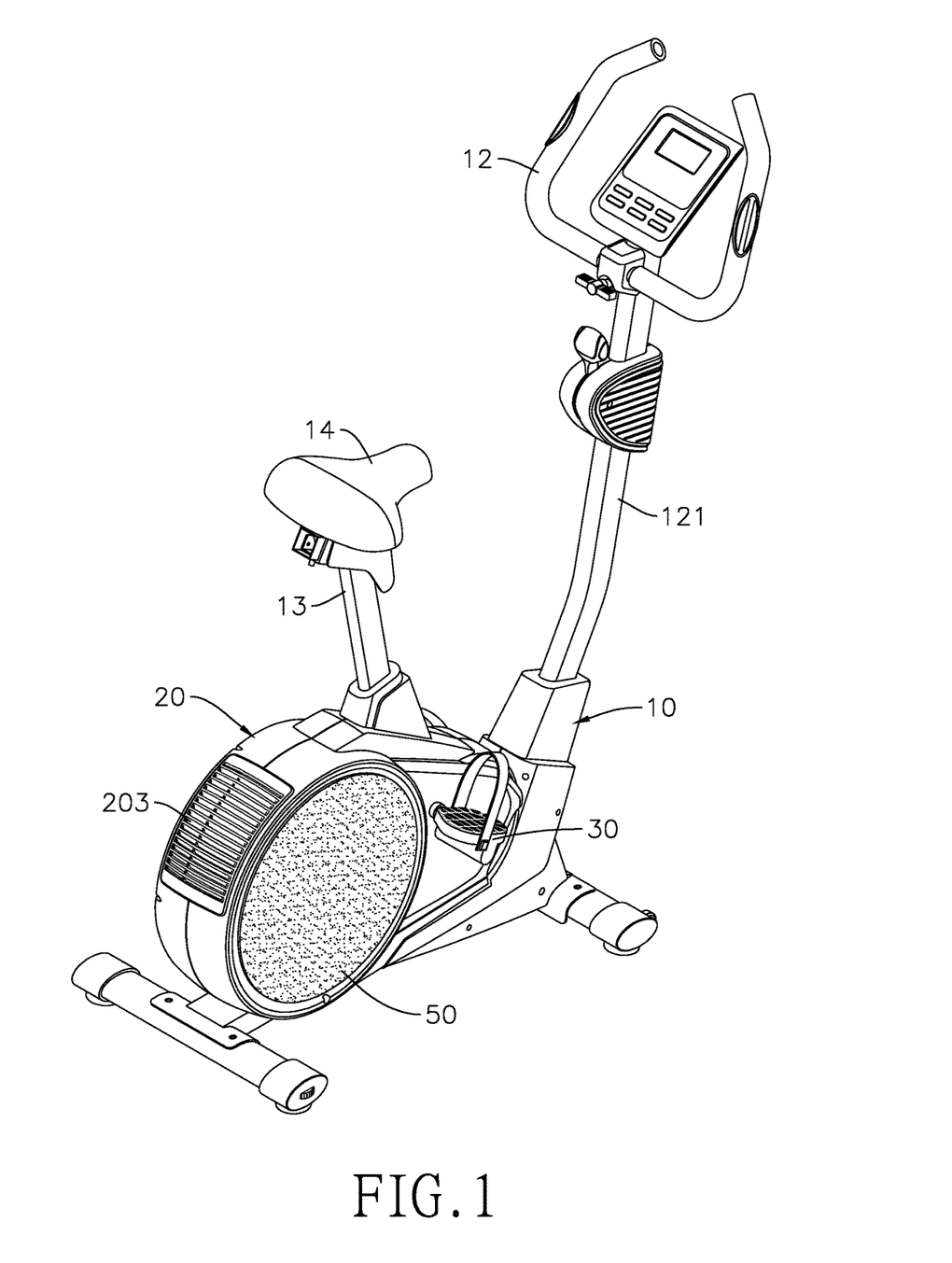
FIG. 1 is a perspective view of a first embodiment of an air-cleaning fitness device in accordance with the present invention.
Figure 2:
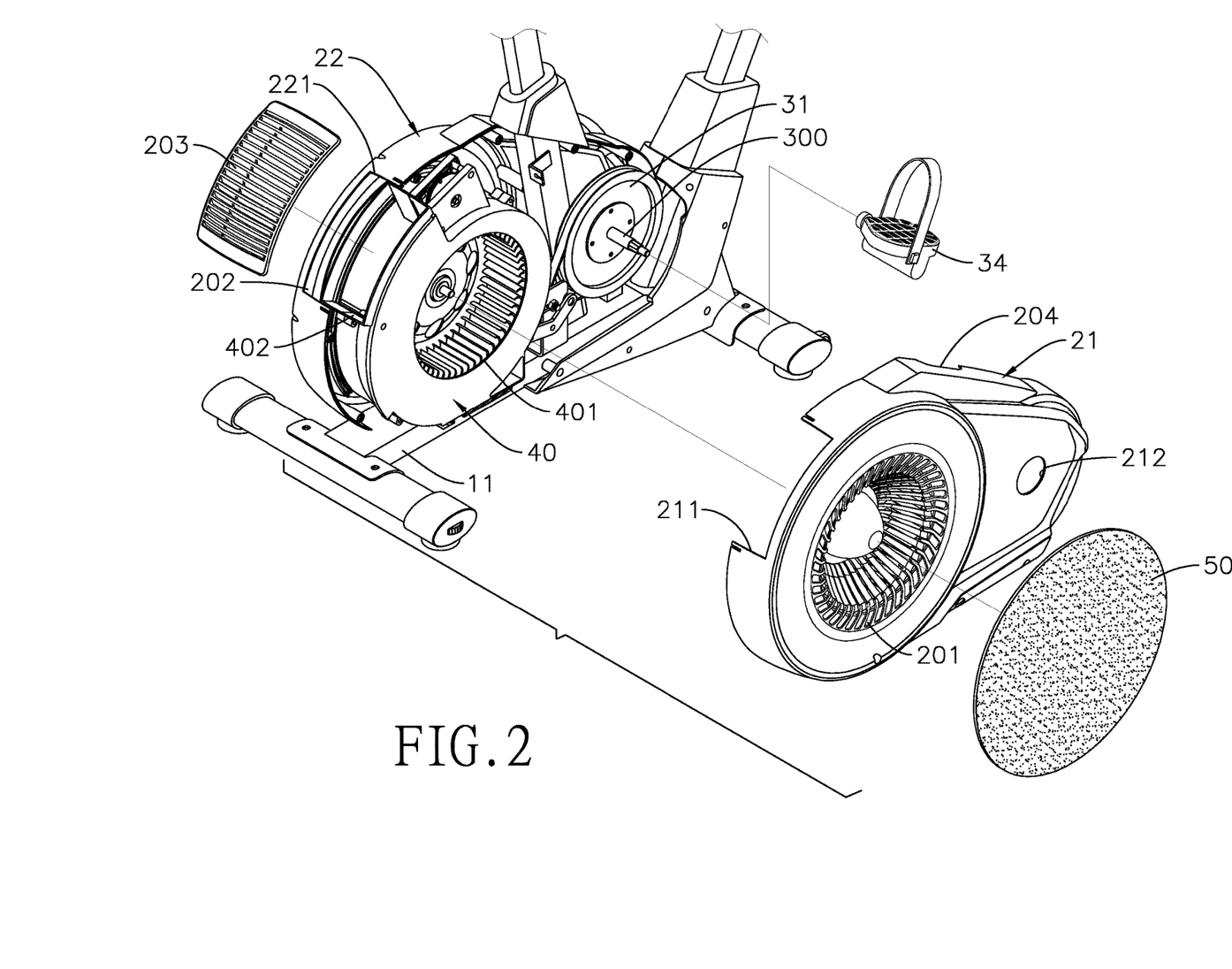
FIG. 2 is an enlarged exploded perspective view of the air-cleaning fitness device in FIG. 1.

With reference to FIGS. 1 and 2, a first embodiment of an air-cleaning fitness device in accordance with the present invention has a main frame 10, a housing 20, a driving assembly 30, a fan device 40, and at least one filter 50. Specifically, the first embodiment of the air-cleaning fitness device is an exercise bike.

Figure 3:
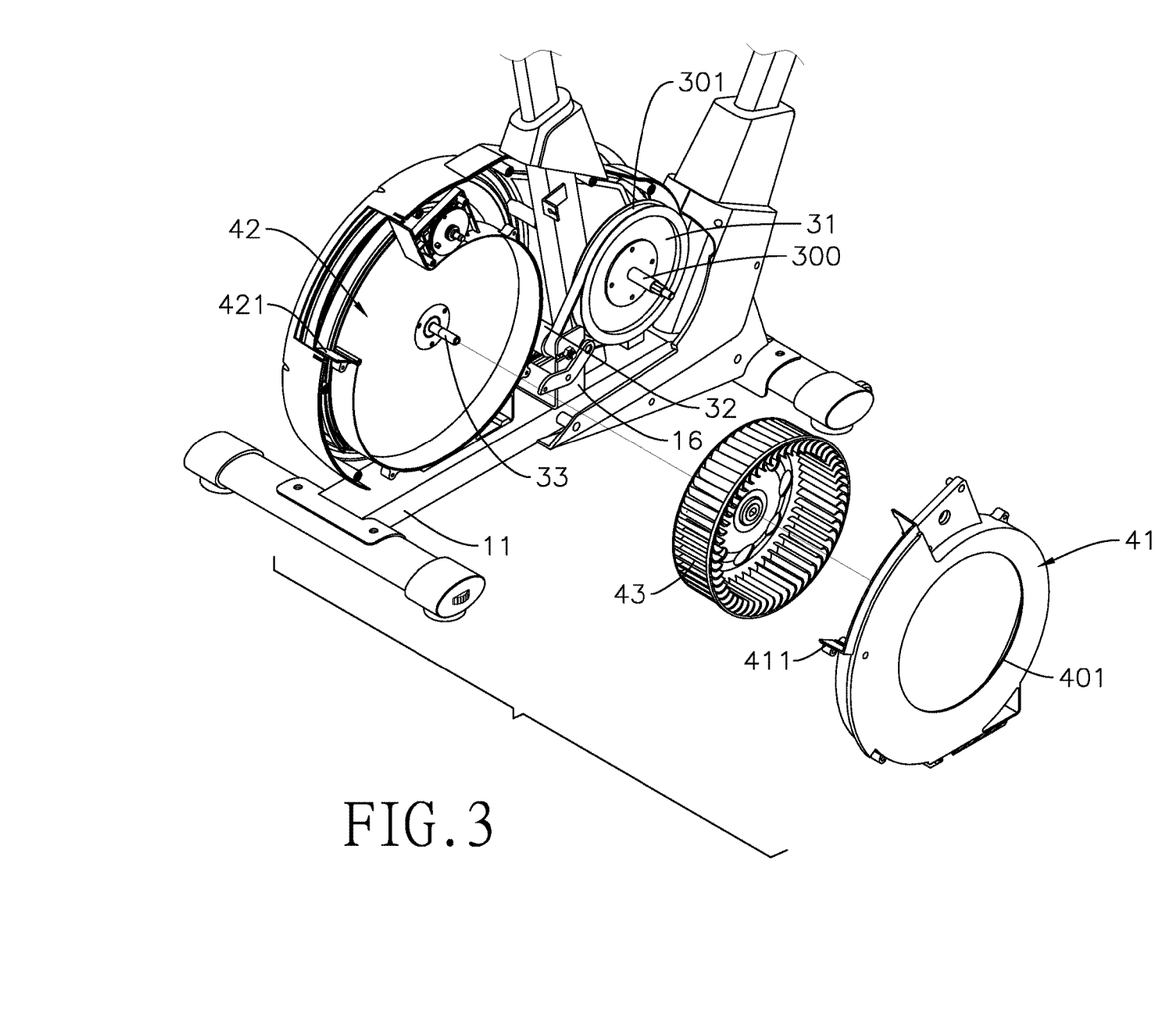
FIG. 3 is an exploded perspective view of the air-cleaning fitness device in FIG. 2.
Figure 4:
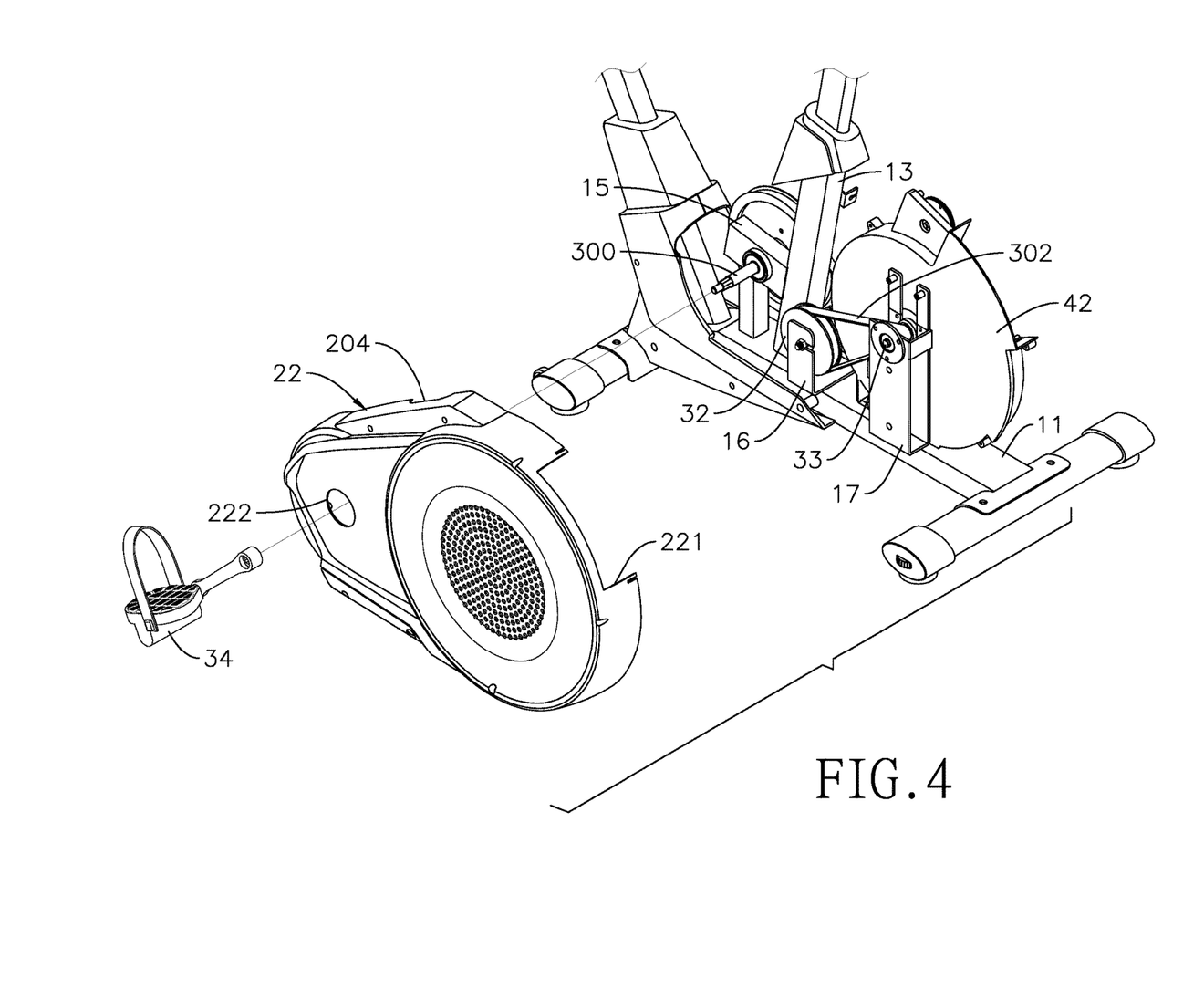
FIG. 4 is another enlarged exploded perspective view of the air-cleaning fitness device in FIG. 1.

With reference to FIGS. 2 to 4, the main frame 10 has a base 11, a handle 12, a mounting bracket 13, a seating element 14, an assembling bracket 15, a first frame 16 and a second frame 17.

The handle 12 is mounted on the base 11 and has a connecting member 121. One of two ends of the connecting member 121 is mounted on the handle 12. The other end of the connecting member 121 is mounted on the base 11.

The mounting bracket 13 is an elongated element and has a first end and a second end. The first end of the mounting bracket 13 is mounted on the base 11.

The seating member 14 is mounted on the second end of the mounting bracket 13.

The assembling bracket 15 is mounted on the base 11.

The first frame 16 is mounted on the base 11 and is spaced apart from and opposite the assembling bracket 15 with respect to the mounting bracket 13.

The second frame 17 is mounted on the base 11 and is spaced apart from the first frame 16.

The housing 20 is mounted on the base 11 of the main frame 10, accommodates the assembling bracket 15, the first frame 16 and the second frame 17, and has a confined space and an airflow passage.

Specifically, the housing 20 has a first housing element 21, a second housing element 22, a first inlet 201, a first outlet 202, a grid cover 203 and a mounting hole 204.

The first inlet 201 is defined through the housing 20.

The first outlet 202 is defined through the housing 20 and is spaced apart from the first inlet 201. The first outlet 202 and the first inlet 201 communicate within the housing 20 to form the airflow passage.

The mounting hole 204 is defined through a top end of the housing 20 and receives the mounting bracket 13.

The first housing element 21 is mounted on the base 11 of the main frame 10 and has a first notch 211, a first through hole 212 and multiple slots.

The first notch 211 is defined in a side wall of the first housing element 21.

The first through hole 212 is defined through one of two ends of the first housing element 21.

Specifically, the multiple slots are radially defined through the other end of the first housing element 21 to form the first inlet 201.

The second housing element 22 is mounted on the base 11, is mounted on the first housing element 21 to form the confined space of the housing 20, and has a second notch 221 and a second through hole 222.

The second notch 221 is defined in a side wall of the second housing element 22 and is aligned with the first notch 211 to form the first outlet 202.

The second through hole 222 is defined through one of two ends of the second housing element 22 and is aligned with the first through hole 212.

The grid cover 203 is mounted on the housing 20 and covers the first outlet 202.

With reference to FIGS. 2 to 4, the driving assembly 30 is mounted on the main frame 10, is located inside the housing 20, and has a first driving wheel 31, a second driving wheel 32, a driving axle 33, at least one driving member 34, a pivoting axle 300, a first driving belt 301 and a second driving belt 302.

The pivoting axle 300 is rotatably mounted on the assembling bracket 15 of the main frame 10. Both ends of the pivoting axle 300 are respectively aligned with the first through hole 212 and the second through hole 222.

The first driving wheel 31 is rotatably mounted on the pivoting axle 300 and is located inside the housing 20.

The second driving wheel 32 is rotatably mounted on the main frame 10, is located inside the housing 20, is spaced apart from the first driving wheel 31, and connects to the first driving wheel 31 by the first driving belt 301.

The driving axle 33 is rotatably mounted on the second frame 17 of the main frame 10, is located inside the housing 20, is spaced apart from the first driving wheel 31 and the second driving wheel 32, and connects to the second driving wheel 32 by the second driving belt 302.

The at least one driving member 34 extends out of the housing 20. In the first embodiment, an amount of the at least one driving member 34 is two. The two driving members 34 that are two pedals are respectively mounted on the two ends of the pivoting axle 300.

With reference to FIGS. 2 to 4, the fan device 40 is mounted on the main frame 10, is located inside the housing 20, connects to the driving assembly 30, and has a first casing element 41, a second casing element 42, a fan wheel 43, a second inlet 401 and a second outlet 402.

The first casing element 41 is mounted on the base 11, is aligned with the first housing element 21 of the housing 20, and has a first opening 411.

The first opening 411 is defined through a side wall of the first casing element 41.

The second inlet 401 is defined through the first casing element 41 and is axially aligned with the first inlet 201 of the housing 20.

The second casing element 42 is mounted on the base 11, is mounted on the first casing element 41, is located in the second housing element 22, receives the driving axle 33, and has a second opening 421.

The second opening 421 is defined through a side wall of the second casing element 42, and is aligned with the first opening 411 to form the second outlet 402. The second outlet 402 is radially aligned with the first outlet 202 of the housing 20.

The fan wheel 43 is located inside the first casing element 41 and the second casing element 42, and is mounted on the driving axle 33.

With reference to FIGS. 2 to 4, the at least one filter 50 is mounted on the housing 20 and covers the first inlet 201. The at least one filter 50 may be made of activated carbon or filter cotton.

The at least one filter 50 may be mounted removably on the housing 20, such as by screws.

The at least one filter 50 may be attached on the housing 20, such as by glue or the Velcro®.

Specifically, the at least one filter 50 is capable of covering the first outlet 202. Moreover, an amount of the at least one filter 50 may be two. The two filters 50 are respectively mounted on the housing 20, and respectively cover the first inlet 201 and the first outlet 202.

Figure 5:
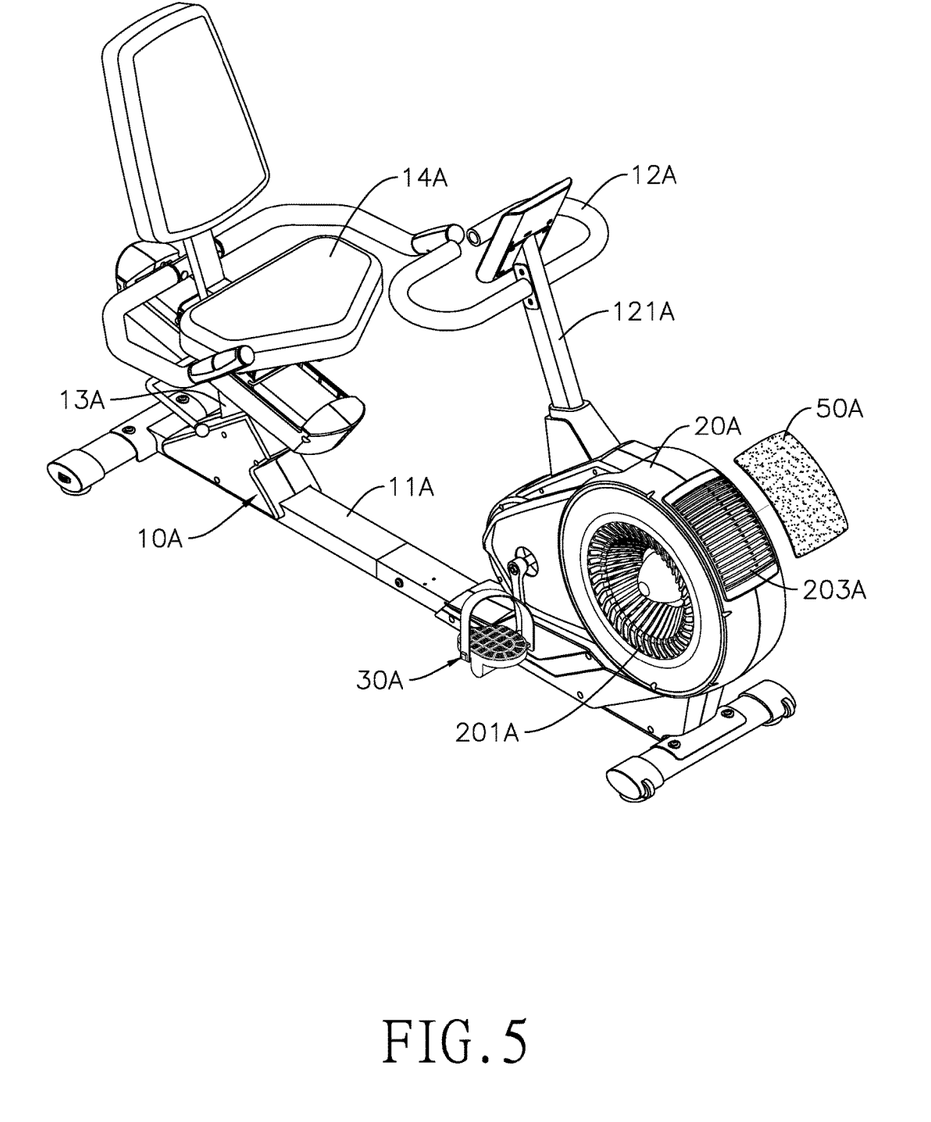
FIG. 5 is a perspective view of a second embodiment of the air-cleaning fitness device in accordance with the present invention.

With reference to FIG. 5, a second embodiment of the air-cleaning fitness device in accordance with the present invention is a recumbent bike.

The housing 20A, the driving assembly 30A and the fan device (not shown in FIG. 5) in the second embodiment are the same as the housing 20, the driving assembly 30 and the fan device 40 in the first embodiment. The differences between the first embodiment and the second embodiment are the locations of the at least one filter 50A and the handle 12A.

Specifically, the at least one filter 50A covers the grid cover 203A.

The handle 12A is mounted on the top end of the housing 20A with the connecting member 121A. The connecting member 121A is mounted through the mounting hole (not shown in FIG. 5) of the housing 20A and is mounted on the main frame 10A.

The mounting bracket 13A is mounted on the base 11A.

The seating element 14A is mounted on the mounting bracket 13A.

Figure 6:
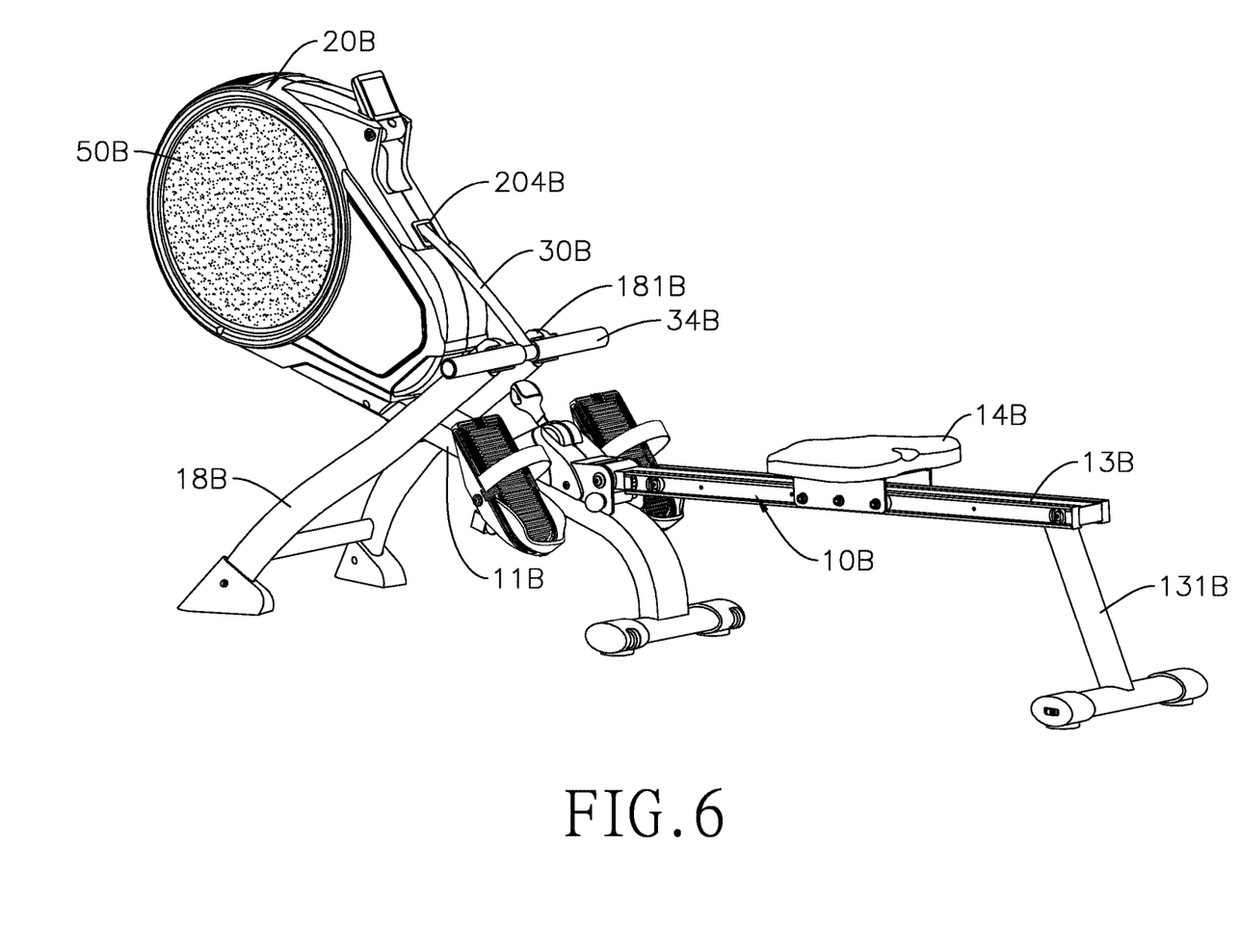
FIG. 6 is a perspective view of a third embodiment of the air-cleaning fitness device in accordance with the present invention.
Figure 7:
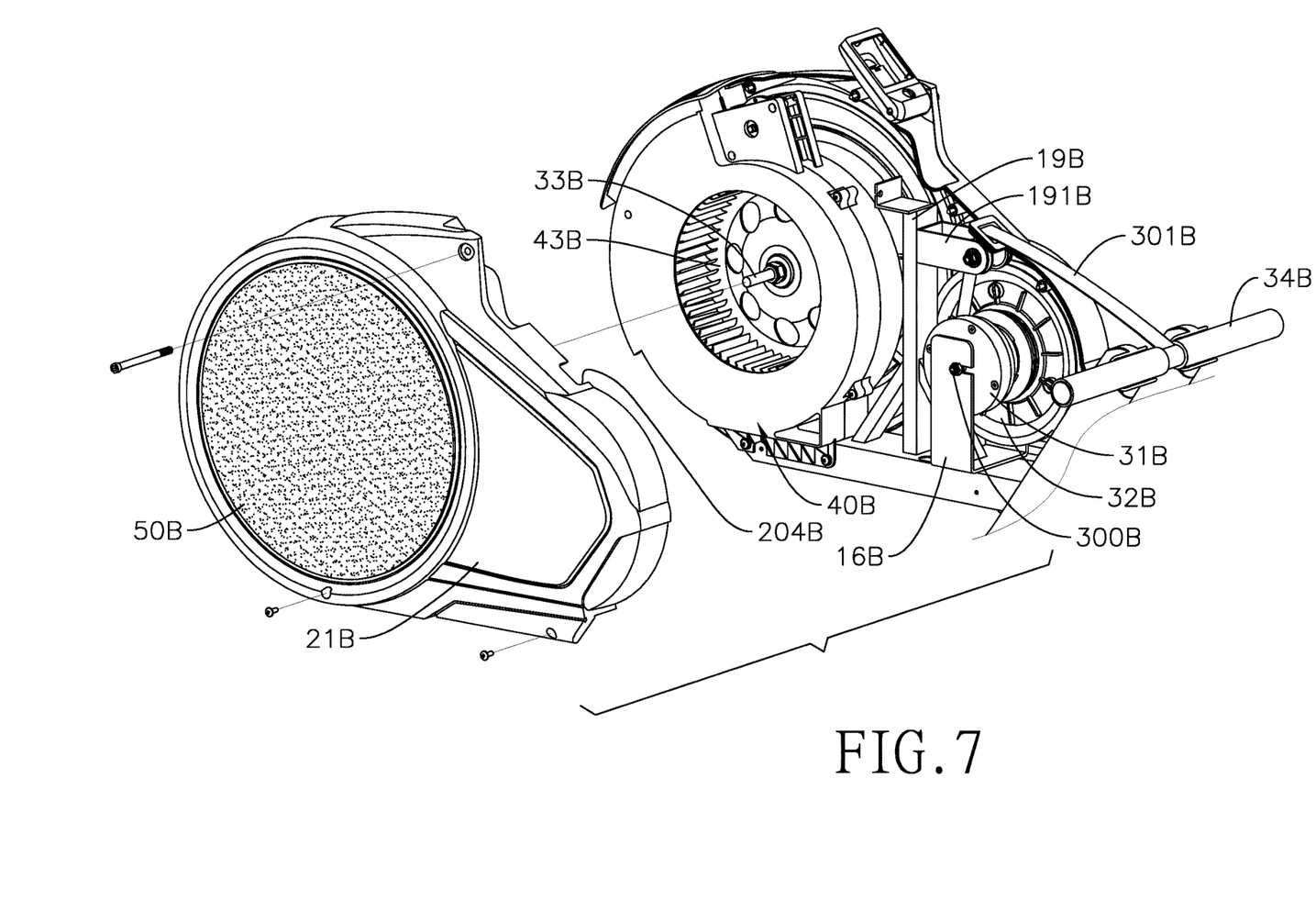
FIG. 7 is an enlarged exploded perspective view of the air-cleaning fitness device in FIG. 6.
Figure 8:
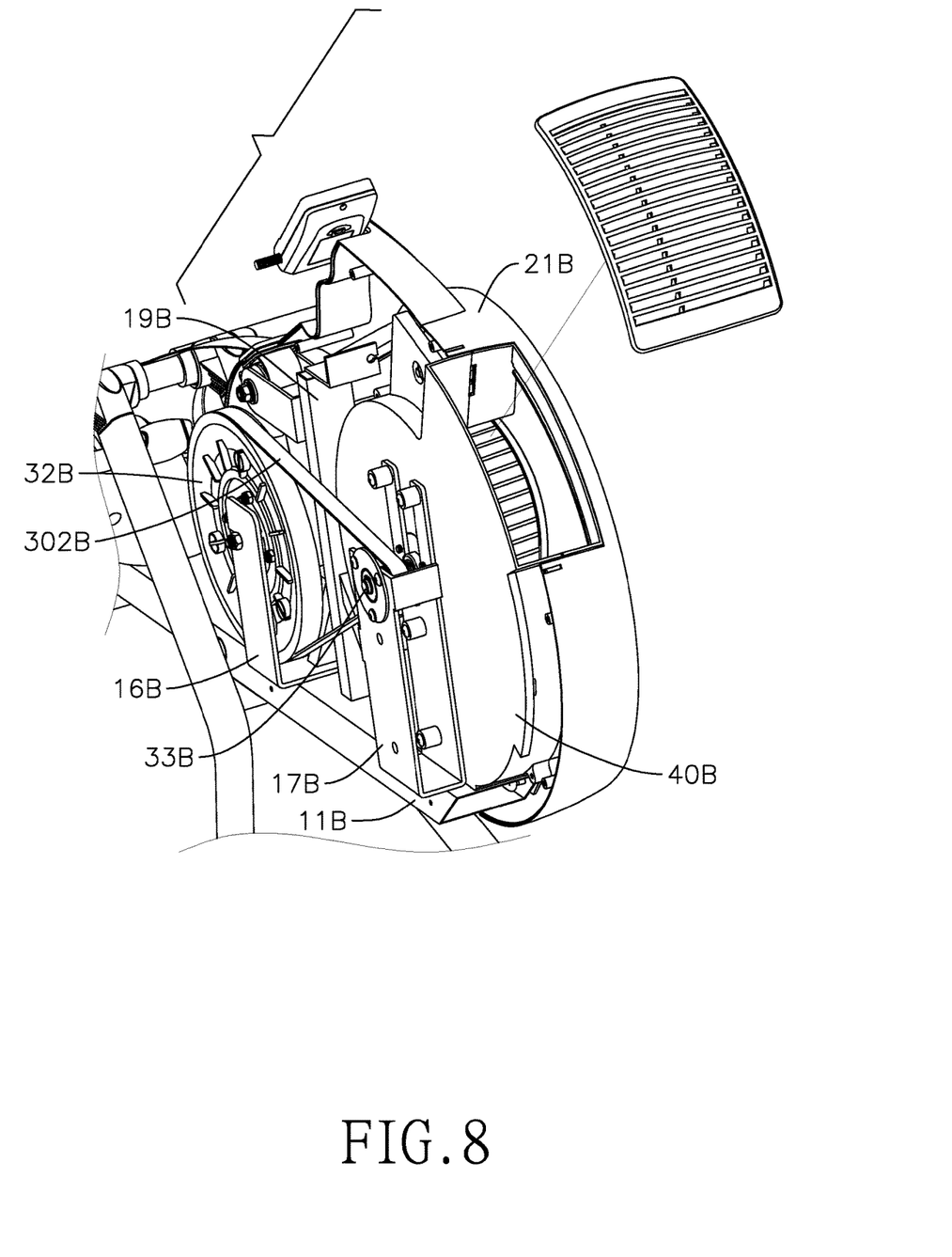
FIG. 8 is another enlarged exploded perspective view of the air-cleaning fitness device in FIG. 6.

With reference to FIGS. 6 to 8, a third embodiment of the air-cleaning fitness device in accordance with the present invention is a rowing machine. The differences between the main frame 10B, the housing 20B and the driving assembly 30B in the third embodiment and the main frame 10, the housing 20 and the driving assembly 30 in the first embodiment are described as follows.

In the third embodiment of the air-cleaning fitness device, the main frame 10B further has a supporting member 18B and a third frame 19B. The main frame 10B does not have the assembling bracket 15 in the first embodiment.

The mounting bracket 13B is a rail and has a supporting part 131B. One of the two ends of the mounting bracket 13B is mounted on the base 11B. The supporting part 131B is mounted on the other end of the mounting bracket 13B to abut the ground.

The seating element 14B is slidably mounted on the mounting bracket 13B.

The first frame 16B is mounted on the base 11B and is located inside the housing 20B.

The second frame 17B is mounted on the base 11B, is located inside the housing 20B and is spaced apart from the first frame 16B.

The supporting member 18B is mounted on the base 11B, abuts the ground and has a restricting element 181B. The restricting element 181B is formed in the supporting member 18B.

The third frame 19B is mounted on the base 11B, is located inside the housing 20B, is spaced apart from the first frame 16B and the second frame 17B, and has a mounting part 191B. The third frame 191B protrudes from the third frame 19B.

The housing 20B has a mounting hole 204B that is defined through a top end of the of the housing 20B. The housing 20B does not have the first through hole 212 and the second through hole 222 in the first embodiment.

The driving assembly 30B has a first driving wheel 31B, a second driving wheel 32B, a driving axle 33B, at least one driving member 34B, a pivoting axle 300B, a first driving belt 301B and a second driving belt 302B.

The pivoting axle 300B is rotatably mounted on the first frame 16B of the main frame 10B.

The first driving wheel 31B and the second driving wheel 32B are coaxially mounted on the pivoting axle 300B.

The first driving belt 301B is mounted around the pivoting axle 300B, abuts the mounting part 191B of the third frame 19B, and is mounted through the mounting hole 204B of the housing 20B. Specifically, the first driving belt 301B is capable of driving the pivoting axle 300B to rotate, thereby driving the first driving wheel 31B and the second driving wheel 32B. The first driving belt 301B, the first driving wheel 31B and the second driving wheel 32B are conventional techniques, and details thereof are omitted.

The driving axle 33B is rotatably mounted on the second frame 17B of the main frame 10B, is mounted on the fan wheel 43B of the fan device 40B, and connects to the second driving wheel 32B with the second driving belt 302B.

The at least one driving member 34B is a rod, is capable of putting on the restricting element 181B of the supporting member 18B, and is mounted on the first driving belt 301B.

The at least one filter 50B is mounted on the first housing element 21B and covers the first inlet 201B.

The at least one filter 50 is suitable for any kind of fitness device, such as the excise bike or the rowing machine. The airflow is introduced by the fan device and passes through the at least one filter 50. The at least one filter 50 may be mounted on the first inlet 201 and/or the first outlet 202. When the user operates the air-cleaning fitness device, the air-cleaning fitness device purifies the air at the same time.

The first inlet 201 and the first outlet 202 are respectively aligned with the second inlet 401 and the second outlet 402. Meanwhile, the first housing element 21 is mounted on the second housing element 22 to form the confined space. Thus, the airflow passage that is passed through by the airflow is formed for air cleaning.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An air-cleaning fitness device comprising:
   a main frame having
      a base;
      a mounting bracket having
         a first end mounted on the base; and
         a second end; and
      a seating element mounted on the second end of the mounting bracket;
   a housing mounted on the base of the main frame and having a confined space and an airflow passage;
   a driving assembly mounted on the main frame, located inside the housing, and having:
      at least one driving member extending out of the housing;
      a first driving wheel rotatably mounted on the main frame, located inside the housing, connecting to the at least one driving member, and rotated by the at least one driving member;
      a second driving wheel rotatably mounted on the main frame, located inside the housing, spaced apart from the first driving wheel, connecting to the first driving wheel, and rotated by the first driving wheel; and
      a driving axle rotatably mounted on the main frame, connecting to the second driving wheel, and rotated by the second driving wheel;
   a fan device mounted on the main frame, located inside the housing, and connecting to the driving assembly and having:
      a fan wheel mounted on and rotated by the driving axle; and
      at least one filter mounted on the housing and covering the airflow passage of the housing.

2. The air-cleaning fitness device as claimed in claim 1, wherein
   the housing has
      a first inlet defined through the housing; and
      a first outlet defined through the housing and spaced apart from the first inlet, wherein the first outlet and the first inlet communicate within the housing to form the airflow passage; and
   the at least one filter is mounted on the housing and covers the first inlet.

3. The air-cleaning fitness device as claimed in claim 2, wherein the at least one filter is mounted removably on the housing.

4. The air-cleaning fitness device as claimed in claim 2, wherein the at least one filter is attached on the housing.

5. The air-cleaning fitness device as claimed in claim 1, wherein
   the housing has
      a first inlet defined through the housing; and
      a first outlet defined through the housing and spaced apart from the first inlet to form the airflow passage; and
   the at least one filter is mounted on the housing and covers the first outlet.

6. The air-cleaning fitness device as claimed in claim 5, wherein the at least one filter is mounted removably on the housing.

7. The air-cleaning fitness device as claimed in claim 5, wherein the at least one filter is attached on the housing.

8. The air-cleaning fitness device as claimed in claim 1, wherein
   the housing has
      a first inlet defined through the housing; and
      a first outlet defined through the housing and spaced apart from the first inlet to form the airflow passage; and
   the at least one filter is two filters wherein the two filters are respectively mounted on the housing, and respectively cover the first inlet and the first outlet.

9. The air-cleaning fitness device as claimed in claim 8, wherein the two filters are mounted removably on the housing.

10. The air-cleaning fitness device as claimed in claim 8, wherein
    the two filters are attached on the housing.

11. The air-cleaning fitness device as claimed in claim 1, wherein
    the at least one filter is mounted removably on the housing.

12. The air-cleaning fitness device as claimed in claim 2, wherein
    the at least one filter is attached on the housing.

13. The air-cleaning fitness device as claimed in claim 1, wherein
    the housing further has
       a first housing element mounted on the base of the main frame and having
          a first notch defined in a side wall of the first housing element; and
          multiple slots radially defined through the first housing element to form a first inlet;

a second housing element mounted on the base of the main frame and having
 a second notch defined in a side wall of the second housing element, wherein the second housing element is mounted on the first housing element to form the confined space, the second notch is aligned with the first notch to form a first outlet, and the first outlet and the first inlet communicate within the housing to form the airflow passage; and
 a grid cover mounted on the housing and covering the first outlet; and
the at least one filter is capable of covering the grid cover.

14. The air-cleaning fitness device as claimed in claim 1, wherein
the housing further has
 a first inlet defined through the housing; and
 a first outlet defined through the housing and spaced apart from the first inlet to form the airflow passage; and
the fan device has
 a second inlet defined through the fan device and aligned with the first inlet; and
 a second outlet defined through the fan device, spaced apart from the second inlet, and aligned with the first outlet.

15. The air-cleaning fitness device as claimed in claim 14, wherein
the driving axle of the driving assembly is spaced apart from the first driving wheel and the second driving wheel;

the housing further has
 a first housing element mounted on the base of the main frame; and
 a second housing element mounted on the base and mounted on the first housing element to form the confined space, wherein the first inlet is defined through the first housing element, and the first outlet is defined through side walls of the first housing element and the second housing element; and
the fan device has
 a first casing element mounted on the base, aligned with the first housing element of the housing, and having
  a first opening defined in a side wall of the first casing element;
 a second casing element mounted on the base, aligned with the second housing element, receiving the driving axle, and having
  a second opening defined through a side wall of the second casing element, wherein the second inlet is defined through the first casing element, the second casing element is mounted on the first casing element, the second opening is aligned with the first opening to form the second outlet, and the driving axle extends inside the fan device; and
wherein the fan wheel is located inside the first casing element and the second casing element, the second inlet axially aligned with the first inlet of the housing, and the second outlet radially aligned with the first outlet.

* * * * *